United States Patent
Andersson

(10) Patent No.: US 7,044,492 B1
(45) Date of Patent: May 16, 2006

(54) CONNECTION ARRANGEMENT COMPRISING A FIFTH WHEEL

(75) Inventor: Uno Andersson, Gnesta (SE)

(73) Assignee: Scania CV AB (publ), (SE)

( * ) Notice: Subject to any disclaimer, the term of this patent is extended or adjusted under 35 U.S.C. 154(b) by 0 days.

(21) Appl. No.: 10/129,716

(22) PCT Filed: Nov. 7, 2000

(86) PCT No.: PCT/SE00/02172

§ 371 (c)(1),
(2), (4) Date: May 7, 2002

(87) PCT Pub. No.: WO01/34454

PCT Pub. Date: May 17, 2001

(30) Foreign Application Priority Data

Nov. 12, 1999 (SE) .................................... 9904091

(51) Int. Cl.
*B62D 53/08* (2006.01)
(52) U.S. Cl. ...................... 280/433; 384/421
(58) Field of Classification Search ................ 280/433, 280/438.1, 407.1; D12/161, 162; 384/421, 384/396; 248/133, 139, 346.06, 371, 664, 248/659, 903, 922, 923
See application file for complete search history.

(56) References Cited

U.S. PATENT DOCUMENTS

| | | | | |
|---|---|---|---|---|
| 1,958,723 A | * | 5/1934 | Spencer | .................... 280/438.1 |
| 2,138,679 A | * | 11/1938 | Sherman | ...................... 280/436 |
| 2,193,744 A | * | 3/1940 | Shriver | ........................ 280/441 |
| 3,117,772 A | * | 1/1964 | Brown | ........................ 267/269 |
| 3,970,274 A | * | 7/1976 | Resk | ........................ 248/185.1 |
| 4,762,334 A | * | 8/1988 | Altherr | ........................ 280/433 |
| 5,368,324 A | * | 11/1994 | Kaim | ...................... 280/438.1 |
| 5,431,424 A | * | 7/1995 | Colwell | ....................... 280/433 |
| 5,765,849 A | * | 6/1998 | Moulton et al. | ............ 280/433 |
| 6,182,996 B1 | * | 2/2001 | Koetter et al. | .............. 280/433 |

FOREIGN PATENT DOCUMENTS

| | | |
|---|---|---|
| EP | 0694467 | 1/1996 |
| EP | 0768232 | 4/1997 |

* cited by examiner

*Primary Examiner*—Anne Marie Boehler
(74) *Attorney, Agent, or Firm*—Ostrolenk, Faber, Gerb & Soffen, LLP

(57) ABSTRACT

Coupling arrangement intended for mounting on a towing vehicle provided with parallel frame side members and for coupling the towing vehicle detachably to a towed vehicle such as a trailer. The arrangement incorporates a fifth wheel which is tiltably connected to the frame side members by tilt pivot mountings in the regions of the frame side members. Each tilt pivot mounting incorporates a vertically upright support device made integrally and intended to be fastened directly by means of a lower fastening portion to the outside of a vertical web portion of the respective adjacent frame side member. The support device has in its upper end a bearing sleeve in which a hingepin mounted on the underside of the fifth wheel is supported. Each support device incorporates at least two supporting legs which extend between and converge from the fastening portion to the bearing sleeve and a central support leg between the fastening portion and the bearing sleeve.

27 Claims, 3 Drawing Sheets

CONNECTION ARRANGEMENT COMPRISING A FIFTH WHEEL

The invention relates to a coupling or towing arrangement of the kind including a fifth wheel of a towing vehicle.

STATE OF THE ART

U.S. Pat. No. 5,368,324 refers to and describes several different types of fastening systems for fifth wheels. Such a fifth wheel is mounted for tilting on the beam frame of a towing vehicle and constitutes a coupling element with a fastening intended for detachable connection to the corresponding coupling spigot of a trailer vehicle.

The fifth wheel is a horizontally arranged partly circular plate with a radial insertion aperture for the trailer's coupling spigot. This insertion aperture extends radially inwards from an extended edge portion of the plate to the centre of the plate. The fifth wheel is mounted for tilting on the beam frame of the towing vehicle by means of a pair of tilt pivot mountings situated at diametrically opposite side edges of the plate. Each tilt pivot mounting incorporates a forked parallel-flange bearing bracket on the underside of the plate and a pivot bearing which is mounted on top of a horizontal upper flange of the respective frame side member and which incorporates L-section elements which constitute foot portions which are supported on the upper flange of the frame side member.

The parallel-flange bearing brackets are supported for tilting on the pivot bearings by means of pivot pins running through them. Various kinds of strengthening plates and reinforcement elements (e.g. L-section elements or angle support elements) are used in different embodiments to strengthen and stiffen the fastenings of the foot portions of the pivot bearings.

The aforesaid known fifth wheel fastening systems thus involve pivot bearings for the fifth wheel's pivot mountings being situated on top of the horizontal upper flanges of the frame side members, and various kinds of strengthening and stiffening section elements and angle bracket supports being fastened to the tipper flanges and web portions of the frame side members.

The tilt pivot mountings of the fifth wheel are thus composed, according to the aforesaid patent specification, of a number of separate parts and the factors on which their dimensioning directly depends include the width of the upper flanges of the frame side members.

OBJECTS OF THE INVENTION

The primary object of the invention is to provide a coupling arrangement whereby the two tilt pivot mountings of the fifth wheel consist of constructionally simple integrated units which can be fitted directly to the frame side members without having to add any supplementary parts or reinforcement elements.

A further object is to adopt tilt pivot mountings so designed that the total weight of the coupling arrangement can be kept down without impairing the strength or rigidity of the structure.

Another object of the invention is to make the tilt pivot mountings independent of the results of the tolerance on the width dimensions of the towing vehicle's frame.

DESCRIPTION OF THE INVENTION

The above objects are achieved according to the invention by the coupling arrangement indicated in the introduction exhibiting the features described below.

A primary distinguishing feature of the invention is therefore that the two tilt pivot mountings of the coupling arrangement each incorporate a vertically upright integrally made support device intended to be fastened directly, by means of a lower fastening portion, to the outside of a vertical web portion of the adjacent frame side member.

This support device has in its upper end a bearing sleeve in which a hingepin mounted on the underside of the fifth wheel is supported.

The support device incorporates with advantage at least two column-shaped supporting legs which converge upwards from the fastening portion to the bearing sleeve. The force flow in the support device resulting from its being structurally constituted in this way is favourable from the strength point of view when the support device is subjected to large load forces by the trailer vehicle's coupling spigot via the fifth wheel. This preferred embodiment of the support device also means that the latter can have its weight reduced by being provided with one or more lightening holes in the region between the pillar-shaped supporting legs.

In addition to the converging supporting legs, the support device may also have a vertical supporting leg situated between them, as indicated in patent claim 4.

The fastening portion of the support device takes the form with advantage of a horizontally extended "triangular base element" provided with a number of fastening apertures situated at equal intervals for fastening the support device to the outside of the frame side member's web portion by means of fastening bolts running through.

In some cases it may be desirable that the fifth wheel be situated somewhat higher than the upper flanges of the frame side members. In such cases it may be justified to connect the two support devices of the coupling arrangement by means of a special transverse connection preferably situated in accordance it patent claim 5. The transverse connection, which may for example be a rolled section beam element, may itself exhibit, for example, a I-shaped or C-shaped cross-section. The two ends of the transverse connection may then with advantage be fastened in a vertical supporting leg of the support device.

As indicated above, each of the coupling arrangement's support devices has to be made in the form of an undivided integral constructional unit. This may be achieved, for example, by the support device being manufactured as a cast or forged constructional element or being formed from sheetmetal. Alternatively, the support device may consist of components welded together, such as a bearing sleeve welded to a pair of oblique supporting legs joined together at the bottom by a horizontal fastening portion welded to them.

A coupling arrangement with support devices according to the invention will be easy to place in an optimum fitting position in the longitudinal direction along the outside of the frame side members. This makes it easy to move the coupling arrangement's fastening point from a first position along the frame side members to a different frame side position forward or rearward from that first mentioned. Shifting or moving the coupling arrangement along the frame side members in order to place the fifth wheel in the desired position in the longitudinal direction of the towing vehicle will be particularly easy if the two support devices of the coupling arrangement are joined together by a transverse connection.

BRIEF DESCRIPTION OF THE DRAWINGS

The invention will now be illustrated and explained further with reference to embodiments depicted in the attached drawings, which are as follows.

DESCRIPTION OF EMBODIMENTS

Figure 1:
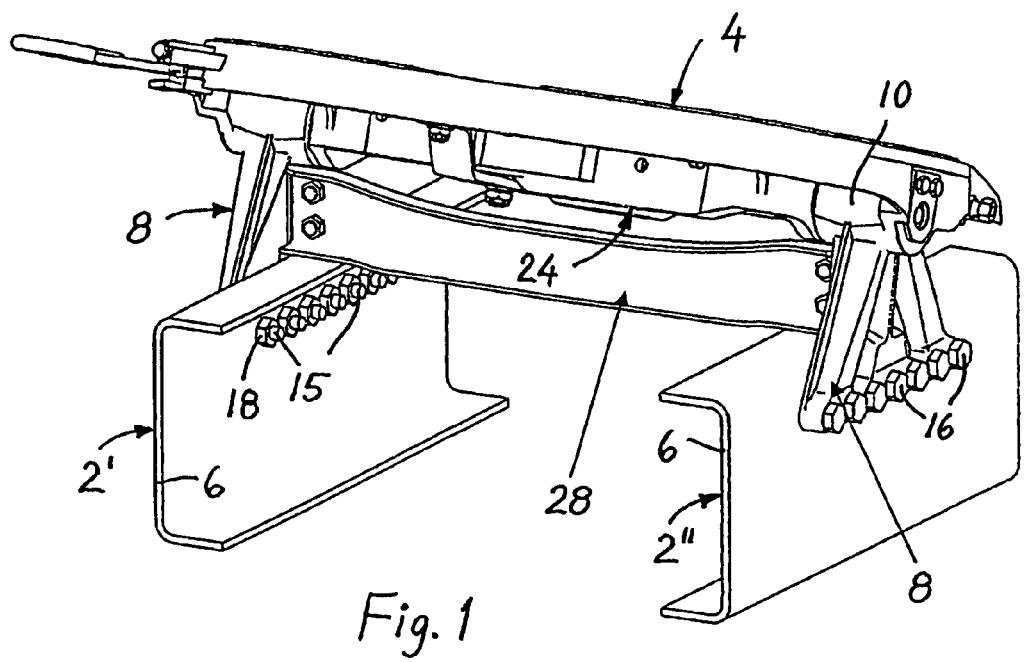
FIG. 1 depicts in perspective an embodiment of a coupling arrangement according to the invention, with the fifth wheel tilted rearwards.
Figure 2:
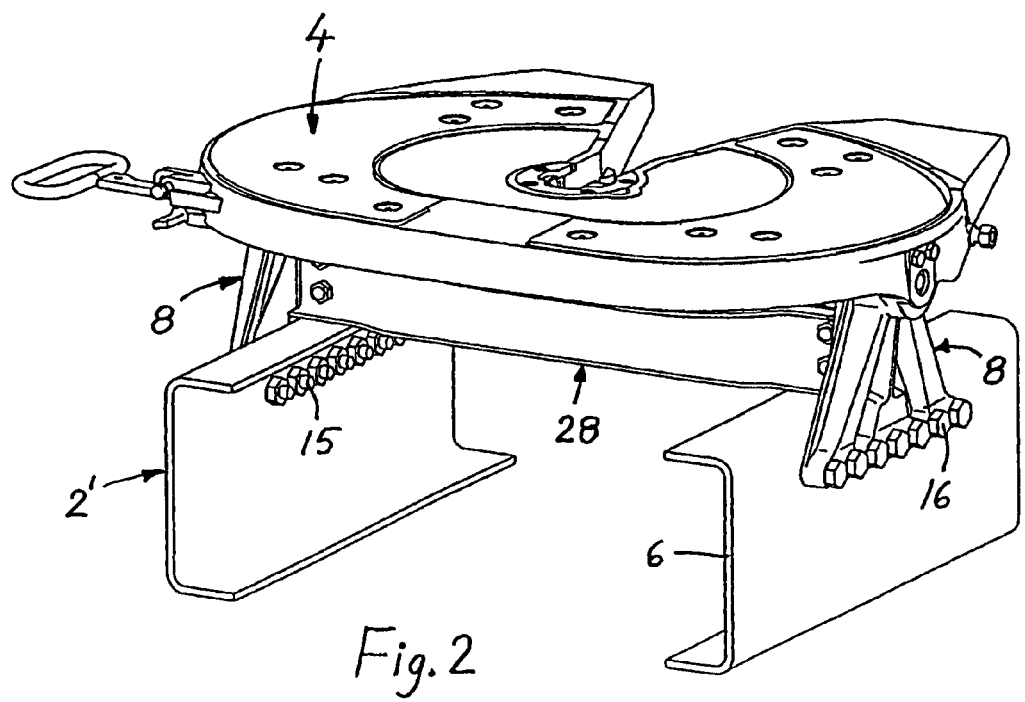
FIG. 2 depicts in perspective the coupling arrangement according to FIG. 1, with the fifth wheel in a horizontal position.
Figure 3:
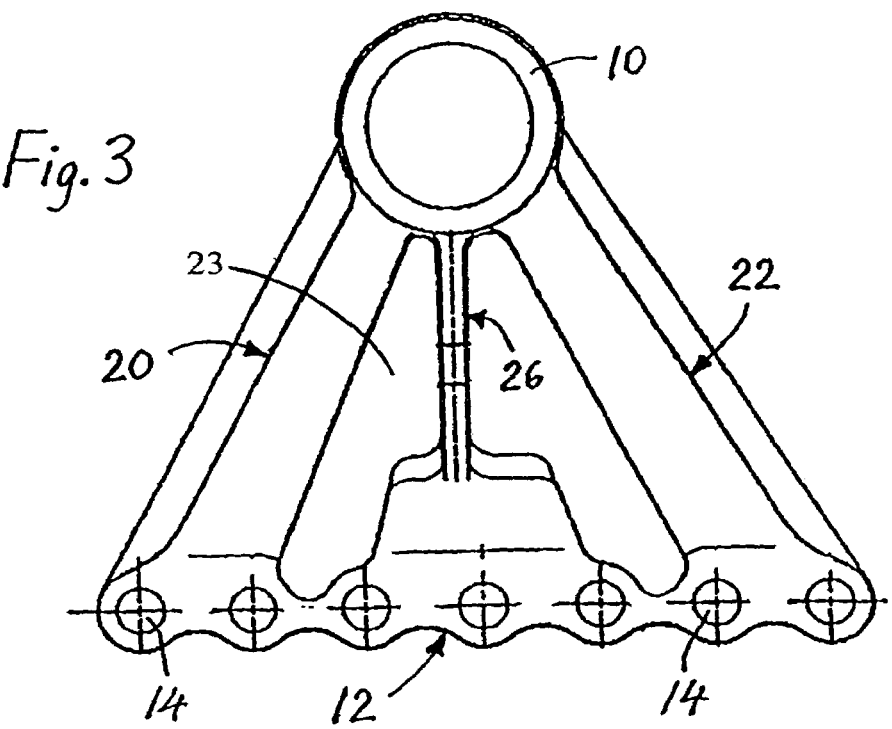
FIG. 3 depicts in vertical projection one of the support devices for the coupling arrangement according to FIGS. 1–2.

FIGS. 1–2 depict an embodiment of a coupling arrangement according to the present invention. The coupling arrangement is mounted on a pair of frame side members 2',2" which run parallel and form part of the beam frame for an otherwise undepicted towing vehicle. The coupling arrangement incorporates three main parts, namely a fifth wheel 4, which is mounted for tilting in the region above the frame side members, and two support devices 8 which are bolted to the outside of the webs 6 of the frame side members and constitute supporting tilt pivot mountings for the fifth wheel 4. The two support devices 8 are of the type shown in more detail in FIG. 3 and consist of an integrally made pivot bearing which is provided at the top with a bearing sleeve 10 and at the bottom with a horizontal fastening portion 12.

The fastening portion 12 has a row of boltholes 14 (numbering seven in this case) running through it to accommodate fastening bolts inserted in holes running through the beam web 6. The fastening bolts 15, which have heads 16, are provided with nuts 18 situated on the inside of the beam web 6. In this embodiment, the number of holes through the beam web 6 corresponds to the number of boltholes 14 in the fastening portion. In an alternative embodiment it is possible to provide more holes in the beam web than in the fastening portion in order to make it possible to shift the fifth wheel along the frame side members and fasten the fifth wheel in a desired position relative to the frame side members. In the present example, threaded connections are used for fastening the respective support devices to the beam web but it is of course also possible to use riveted connections without going outside the concept of the invention.

From the opposite ends of the fastening portion 12, a pair of column-shaped supporting legs 20,22 converge obliquely upwards to the lower part of the bearing sleeve 10. Each support device 8 is thus fastened directly, by its fastening portion 12, to the outside of the adjacent frame side member web 6. Hingepins (not visible in FIGS. 1–2) fitted in the ends of a strengthening and supporting portion 24 which extends diametrically on the underside of the fifth wheel 4 are fitted in the bearing sleeves 10 of the support devices 8.

In this case the support device 8 is provided, in the open space 23 between its two oblique supporting legs 20,22, with a further supporting leg 26 which extends vertically upwards from the fastening portion 12 to the underside of the bearing sleeve 10. In the version depicted in FIGS. 1–2 and FIG. 4 the two support devices 8 of the coupling arrangement are linked together by a transverse connection 28 in the form of an I-bar or C-bar situated transversely above the frame side members 2',2", centrally beneath the bearing sleeves 10 and the strengthening and supporting portion 24. The respective ends of the transverse connection 28 are fastened in the vertical supporting legs 26 of the respective supporting device 8, so the vertical supporting legs 26 are with advantage provided, at least in these fastening regions, with planar web portions of equal thickness.

The pivot-bearing-like support devices 8 are each made in the form of an undivided constructional unit which may be manufactured as a cast or forged constructional element. It is also conceivable that the support devices be made of formed sheetmetal or be made up of components welded together.

Figure 5:
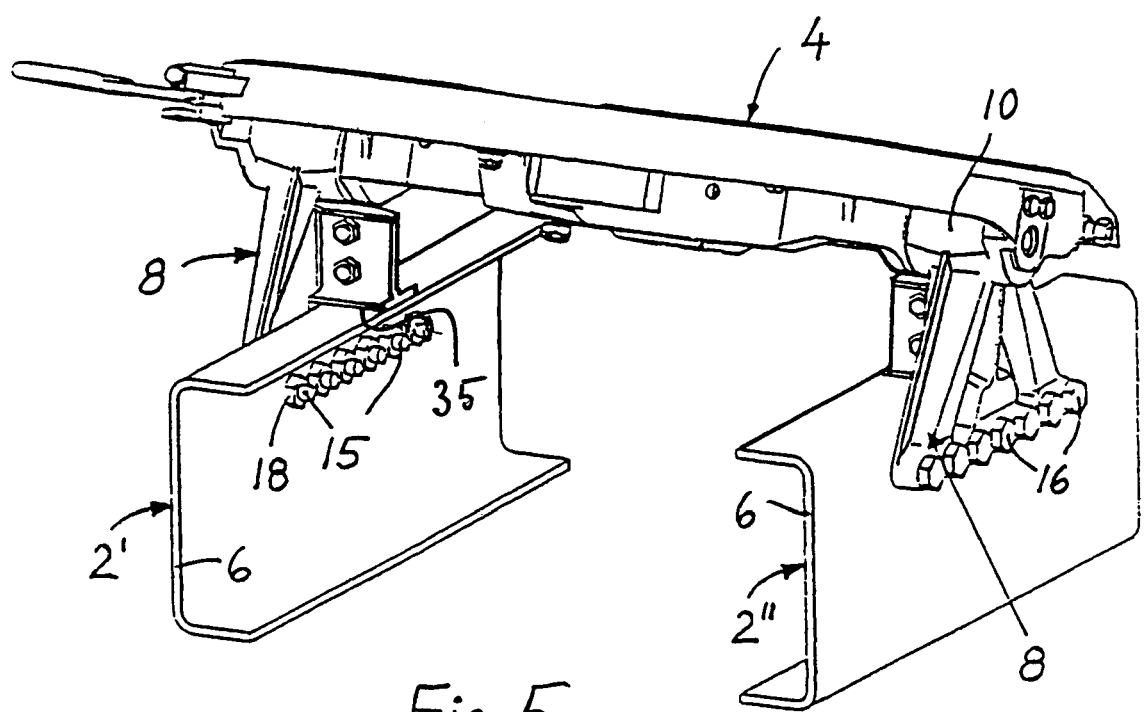
FIG. 5 depicts an alternative embodiment of the support devices according to FIG. 3.

To facilitate fitting the support devices 8 to the respective beam webs 6, each of the support devices 8 is provided, as indicated in FIG. 5, with a protruding portion 35 intended to abut supportingly against a frame side member. During the assembly process, the protruding portion 35 is rested on the top of the frame side member, followed by fitting the fastening bolts 15. The protruding portion 35 may constitute an integral part of the support device 8 or be part of a separate unit which is fitted to the support device 8 by means of any form of fastening device, e.g. threaded connection.

Figure 4:
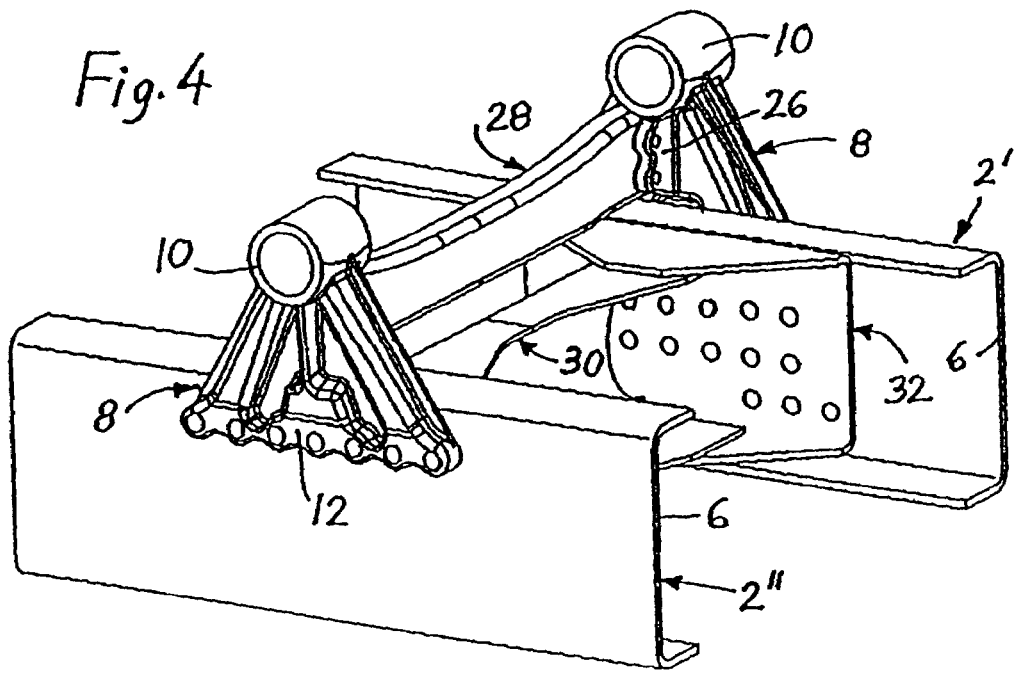
FIG. 4 depicts in perspective the coupling arrangement according to FIGS. 1–2 with the fifth wheel removed.

FIG. 4 shows the same type of coupling arrangement as in FIGS. 1–2 but with the fifth wheel 4 removed. In this case the frame side members 2',2" have a stiffening cross-member 30 fastened between them which is part of the beam frame and which has angle brackets 32 which are fastened to the inside of the respective beam web 6 by means of, inter alia, the bolts 15 used for fastening the support device 8 to the outside of the beam web 6.

The invention claimed is:

1. A towing arrangement for mounting on a towing vehicle, the towing arrangement comprising:
    frame side members of the vehicle;
    a fifth wheel for coupling to a towed vehicle;
    tilt pivot mountings generally toward the frame side members for tiltably mounting the fifth wheel with respect to the frame side members;
    each of the tilt pivot mountings comprising an upright support device,
    the support device having a lower fastening portion for connection to a vertical outer web portion of a respective one of the frame side members,
    the support device having a bearing sleeve located and supported substantially entirely on an upper end thereof;
    each support device including two pillar-shaped support legs separated by at least one open space, and oriented to converge upwardly substantially in a vertical plane adjacent to the vertical outer web portion from being widely spaced apart at the lower fastening portion and converging toward the bearing sleeve,
    the support legs lying entirely outwardly of the vertical outer web portion of the frame side member; and
    a hinge pin supported in the bearing sleeves of the tilt pivot mountings, wherein the hinge pin is mounted on the fifth wheel for tiltably supporting the fifth wheel with respect to the support devices.

2. The towing arrangement of claim 1, wherein the lower fastening portion of the support device has opposite ends and the supporting legs respectively start at the opposite ends of the fastening portion.

3. The towing arrangement of claim 1, further comprising a substantially vertical supporting leg on the support device and between the supporting legs and extending from the fastening portion to the bearing sleeve.

4. The towing arrangement of claim 3, and further comprising a transverse connection between the supporting devices fastened to the outsides of the web portions of the frame side members.

5. The towing arrangement of claim 4, wherein the transverse connection comprises a rolled section beam element;
the bearing sleeves of the support devices being in a vertical plane and the rolled section beam element being in the vertical plane of the bearing sleeves.

6. The towing arrangement of claim 5, wherein the transverse connection has ends fastened in the vertical support legs of the support device.

7. The towing arrangement of claim 4, wherein the transverse connection has ends fastened in the vertical support legs of the support device.

8. The towing arrangement of claim 5, wherein each support device is an undivided part manufactured by at least one of the processes of casting, forging, forming of sheet metal or welding together the components thereof.

9. The towing arrangement of claim 3, wherein each support device is an undivided part manufactured by at least one of the processes of casting, forging, forming of sheet metal or welding together the components thereof.

10. The towing arrangement of claim 3, and further comprising a transverse connection between the supporting devices fastened to the outsides of the web portions of the frame side members.

11. The towing arrangement of claim 10, wherein the transverse connection comprises a rolled section beam element;
the bearing sleeves of the support devices being in a vertical plane and the rolled section beam element being in the vertical plane of the bearing sleeves.

12. The towing arrangement of claim 11, wherein the transverse connection has ends fastened in the vertical support legs of the support device.

13. The towing arrangement of claim 10, wherein the transverse connection has ends fastened in the vertical support legs of the support device.

14. The towing arrangement of claim 11, wherein each support device is an undivided part manufactured by at least one of the processes of casting, forging, forming of sheet metal or welding together the components thereof.

15. The towing arrangement of claim 1, further comprising a transverse connection between the frame side members for connecting the frame side members together.

16. The towing arrangement of claim 15, wherein the transverse connection comprises a rolled section beam element;
the bearing sleeves of the support devices being in a vertical plane and the rolled section beam element being in the vertical plane of the bearing sleeves.

17. The towing arrangement of claim 15, wherein the transverse connection has ends fastened in the vertical support legs of the support device.

18. The towing arrangement of claim 1, wherein each support device is an undivided part manufactured by at least one of the processes of casting, forging, forming of sheet metal or welding together the components thereof.

19. The towing arrangement of claim 1, wherein the support legs have non-solid cross-sections.

20. The towing arrangement of claim 1, wherein the lower fastening portion of the support device has opposite ends and the supporting legs respectively start at the opposite ends of the fastening portion.

21. The towing arrangement of claim 1, further comprising a substantially vertical supporting leg on the support device and between the supporting legs and extending from the fastening portion to the bearing sleeve.

22. The towing arrangement of claim 21, wherein each support device is an undivided part manufactured by at least one of the processes of casting, forging, forming of sheet metal or welding together the components thereof.

23. A towing arrangement for mounting on a towing vehicle, the towing arrangement comprising:
frame side members of the vehicle;
a fifth wheel for coupling to a towed vehicle;
tilt pivot mountings generally toward the frame side members for tiltably mounting the fifth wheel with respect to the frame side members;
each of the tilt pivot mountings comprising an upright support device,
the support device having a lower fastening portion for connection to a vertical outer web portion of a respective one of the frame side members,
the support device having a bearing sleeve located and supported substantially entirely on an upper end thereof,
each support device including two pillar-shaped support legs having non-solid cross-sections, and being oriented to converge upwardly substantially in a vertical plane adjacent to the vertical outer web portion from being widely spaced apart at the lower fastening portion and converging toward the bearing sleeve,
the support legs lying entirely outwardly of the vertical outer web portion of the frame side member; and
a hinge pin supported in the bearing sleeves, wherein the hinge pin is mounted on the fifth wheel supporting to support the fifth wheel with respect to the support devices.

24. The towing arrangement of claim 23, further comprising a transverse connection between the frame side members for connecting the frame side members together.

25. The towing arrangement of claim 24, wherein the transverse connection comprises a rolled section beam element;
the bearing sleeves of the support devices being in a vertical plane and the rolled section beam element being in the vertical plane of the bearing sleeves.

26. The towing arrangement of claim 24, wherein the transverse connection has ends fastened in the vertical support legs of the support device.

27. The towing arrangement of claim 23, wherein each support device is an undivided part manufactured by at least one of the processes of casting, forging, forming of sheet metal or welding together the components thereof.

* * * * *